(12) United States Patent
Boote

(10) Patent No.: US 12,337,579 B2
(45) Date of Patent: Jun. 24, 2025

(54) GLAZING HAVING A COATED PRINT PORTION, METHOD OF MANUFACTURING THE SAME AND USE OF THE SAME

(71) Applicant: Pilkington Group Limited, Nr. Ormskirk Lancashire (GB)

(72) Inventor: Joseph Jeremy Boote, Ormskirk (GB)

(73) Assignee: Pilkington Group Limited, Nr. Ormskirk Lancashire (GB)

( * ) Notice: Subject to any disclaimer, the term of this patent is extended or adjusted under 35 U.S.C. 154(b) by 72 days.

(21) Appl. No.: 17/794,106

(22) PCT Filed: Jan. 20, 2021

(86) PCT No.: PCT/GB2021/050121
§ 371 (c)(1),
(2) Date: Jul. 20, 2022

(87) PCT Pub. No.: WO2021/148785
PCT Pub. Date: Jul. 29, 2021

(65) Prior Publication Data
US 2023/0049243 A1     Feb. 16, 2023

(30) Foreign Application Priority Data
Jan. 20, 2020   (GB) ..................... 2000785

(51) Int. Cl.
*B32B 1/00*     (2024.01)
*B32B 3/10*     (2006.01)
(Continued)

(52) U.S. Cl.
CPC .................. *B32B 3/10* (2013.01); *B32B 1/00* (2013.01); *B32B 17/061* (2013.01); *B32B 33/00* (2013.01);
(Continued)

(58) Field of Classification Search
CPC ........ B32B 17/10192; B32B 17/10036; B32B 17/10238; B32B 2255/205;
(Continued)

(56) References Cited

U.S. PATENT DOCUMENTS 5,414,240 A * 5/1995 Carter ............... B32B 17/10174
219/547
6,559,419 B1   5/2003 Sol et al.
(Continued)

FOREIGN PATENT DOCUMENTS

| GB | 2381179 A * | 4/2003 | ....... B32B 17/10036 |
|---|---|---|---|
| WO | 0072634 A1 | 11/2000 | |
| WO | 2012004280 A1 | 1/2012 | |

OTHER PUBLICATIONS

International Search Report (PCT/ISA/210) and Written Opinion (PCT/ISA/237) mailed on Apr. 1, 2021, by the European Patent Office as the International Searching Authority for International Application No. PCT/GB2021/050121.
(Continued)

*Primary Examiner* — Kevin C T Li
(74) *Attorney, Agent, or Firm* — BUCHANAN INGERSOLL & ROONEY PC

(57) ABSTRACT

The invention concerns a glazing comprising a first glass sheet having a surface; a printed layer on a part of the surface of the first glass sheet; a conductive coating on a part of the printed layer forming a coated print portion and on a part of the surface of the first glass sheet forming a coated glass portion; first and second busbars in electrical contact with the conductive coating and comprising a first or second busbar portion arranged on a different axis therefrom; a first printed layer portion adjacent the first or second busbar portion forming an adjustable coated print portion between the first and second busbars.

16 Claims, 4 Drawing Sheets

(51) Int. Cl.
 *B32B 17/06* (2006.01)
 *B32B 33/00* (2006.01)
 *B32B 38/00* (2006.01)

(52) U.S. Cl.
 CPC ...... *B32B 38/145* (2013.01); *B32B 2255/205* (2013.01); *B32B 2307/202* (2013.01); *B32B 2311/08* (2013.01); *B32B 2315/08* (2013.01)

(58) Field of Classification Search
 CPC .... B32B 2264/1051; B32B 2264/1055; B32B 2307/302; B32B 2605/006; B32B 33/00; B32B 38/145; B32B 2307/202; B32B 2311/08; B32B 2315/08; B32B 3/10; B32B 1/00; B32B 17/061; B60J 1/17; H05B 2203/005; H05B 2203/011; H05B 2203/013; H05B 3/84; C03C 17/3607; C03C 17/36; C03C 17/3639; C03C 17/3644; C03C 17/3655; C03C 17/3673; C03C 17/3681
 See application file for complete search history.

(56) References Cited

U.S. PATENT DOCUMENTS

| | | | |
|---|---|---|---|
| 2007/0108175 A1* | 5/2007 | Andrt | B32B 17/10385 |
| | | | 219/203 |
| 2008/0264930 A1* | 10/2008 | Mennechez | H05B 3/84 |
| | | | 219/552 |
| 2015/0351160 A1 | 12/2015 | Phan et al. | |
| 2017/0251525 A1 | 8/2017 | Chamberlain et al. | |
| 2017/0251527 A1* | 8/2017 | Schall | B32B 17/1077 |

OTHER PUBLICATIONS

Great Britain Search Report mailed on Jul. 15, 2020 by the Intellectual Property Office in corresponding Great Britain Patent Application No. 2000785.2. (3 pages).

* cited by examiner

GLAZING HAVING A COATED PRINT PORTION, METHOD OF MANUFACTURING THE SAME AND USE OF THE SAME

FIELD OF THE INVENTION

The invention concerns a glazing having a coated print portion, a method of manufacturing said glazing and use of said glazing.

Coated print portions in a glazing are regions are known where a conductive coating has been deposited on a printed layer on glass for uses such as electric heating of a vehicle window. The same conductive coating deposited directly on glass may have lower sheet resistance, because roughness of the printed layer causes sheet resistance to increase.

BACKGROUND OF THE INVENTION

GB1915907.8 (Boote), pending with this application, discloses a glazing provided with a conductive coating connected to two busbars. By changing the shape of a coated print portion, heating current may be directed to achieve a desired non-uniform heating of the glazing. A large printed layer for a group of sensors, known as a sensor farm, may divert current around the sensor farm advantageously increasing temperatures either side thereof.

U.S. Ser. No. 10/455,645B2 (Masschelein) discloses a glass sheet having its edges masked by an enamel strip. Conductive layers, comprising three silver layers, are deposited on the enamel strip and a busbar comprising a copper band is applied on top of the conductive layers.

US20150351160A1 (Phan) discloses a laminated glass comprising an exterior glass with a masking print and an interior glass with an electric heating layer and three busbars.

There remains a need for an alternative glazing having a coated print portion to provide in use a predetermined heat distribution across the glazing. There remains a need for a method of manufacturing an alternative glazing.

SUMMARY OF THE INVENTION

The present invention accordingly provides, in a first aspect, a glazing comprising:
 a first glass sheet having a surface;
 a printed layer on a part of the surface of the first glass sheet;
 a conductive coating on a part of the printed layer forming a coated print portion and on a part of the surface of the first glass sheet forming a coated glass portion;
 first and second busbars in electrical contact with the conductive coating and comprising a first or second busbar portion arranged on a different axis therefrom;
 a first printed layer portion adjacent the first or second busbar portion forming a first adjustable coated print portion between the first and second busbars.

Preferably, the first and second busbars are arranged on the printed layer.

Preferably, the glazing comprises a data transmission window wherein the conductive coating is at least partly absent.

Preferably, the data transmission window is arranged between the first or second busbar portion and an opposing busbar.

Preferably, the data transmission window is arranged between the first or second busbar portion and an adjacent edge of the glazing.

Preferably, the glazing comprises a second printed layer portion adjacent the first printed layer portion forming a second adjustable coated print portion between the first and second busbars.

Preferably, the first or second busbar portion is shaped as a line parallel to the first or second busbar or at an angle to the first or second busbar or shaped as a curve.

Preferably, the first adjustable coated print portion or second adjustable coated print portion is shaped as a rectangle, square, triangle, polygon or section of an ellipse.

Preferably, first adjustable coated print portion or second adjustable coated print portion is arranged in the centre or in at least one corner of the glazing.

Preferably, the glazing comprises a pattern of printed silver dots in electrical contact with the coated print portion forming a first or second low sheet resistance coated print portion.

Preferably, the first and second busbars are printed using screen-printing paste comprising frit and at least 80% silver.

Preferably, the coated print portion has sheet resistance in a range 1 to 300 ohms/square, preferably 2.5 to 120 ohms/square, most preferably 3 to 8 ohms/square and a Developed Interfacial Area Ratio Sdr in a range 1 to 30%.

Preferably, the glazing comprises a second glass sheet bonded to the first glass sheet by a ply of interlayer material to form a laminated glass.

The glazing may have any suitable shape, for example trapezoidal, rectangular or triangular. Glazing thickness including all glazing material, interlayer material and conductors may be any thickness, for example 2.5 mm to 10.6 mm, preferably 2.6 mm to 3.8 mm, more preferably 2.7 mm to 3.2 mm. Glazing material may be any suitable material, for example soda-lime-silica glass or borosilicate glass.

First and second glass sheets may be formed by the float process and may be annealed. Glass sheets may be heat strengthened or tempered. In a laminated glass, the first glass sheet may be an inner ply of glazing material and the second glass sheet may be an outer ply of glazing material, or vice versa.

The glazing may comprise two or more plies of interlayer material. The interlayer material may be polyvinyl butyral (PVB) which is advantageous because it exhibits good adhesion after lamination to glass and allows conductors in the form of wires to be embedded during manufacture. PVB thickness may be any thickness, for example 0.76 mm.

The present invention provides, in a second aspect, a method of manufacturing a glazing according to the first aspect, comprising steps:
 providing a first glass sheet having a surface;
 printing an insulating layer on a part of the surface of the first glass sheet;
 depositing a conductive coating on a part of the printed layer forming a coated print portion and on a part of the surface of the first glass sheet forming a coated glass portion;
 providing first and second busbars in electrical contact with the conductive coating and comprising a first or second busbar portion arranged on a different axis therefrom;
 arranging a first printed layer portion adjacent the first or second busbar portion forming a first adjustable coated print portion between the first and second busbars.

Printing of the printed layer may be by any method, for example screen printing.

The present invention provides, in a third aspect, use of glazing according to the first aspect as a window for a building or a window for a vehicle. The invention is suitable for use as a windshield, a rear window, side window or roof window of a vehicle as laminated or monolithic toughened glass.

Effect of the Invention

The inventor has found that providing a first adjustable coated print portion between the first and second busbar is advantageous to achieve a desired heat distribution across the glazing. The invention reduces temperatures of unwanted hot spots, increases temperatures of unwanted cold spots and provides faster defogging or defrosting of the glazing in predetermined regions.

Surprisingly, temperature in a centre of a windshield having such an adjustable coated print portion increases, compared with the same windshield without the adjustable coated print portion. At the same time, temperature of a hotspot at a top corner of a windshield adjacent a busbar decreases.

Advantageously, printing of the busbars may take place before depositing the conductive coating to avoid damage to the conductive coating by printing the busbars.

The invention overcomes a technical prejudice found in the prior art that an enamel masking strip should be on another glass sheet than a conductive coating and busbars.

BRIEF DESCRIPTION OF THE DRAWINGS

The present invention will now be described by way of example only and with reference to the accompanying drawings, in which like reference numbers identify like parts.

DETAILED DESCRIPTION

Figure 1:
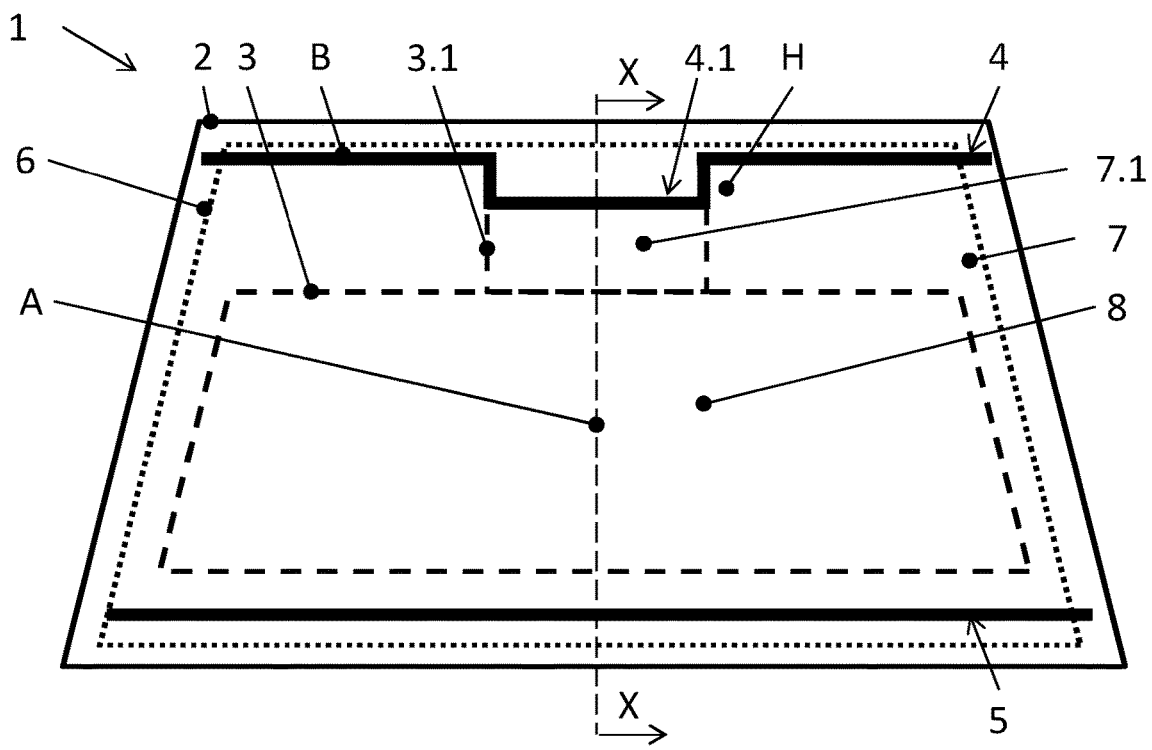
FIG. 1 is a plan view of a glazing according to the invention, having an upper busbar comprising one busbar portion.

Referring to FIG. 1, a glazing 1 comprises a first glass sheet 2, having a surface. A printed layer 3 is deposited on a peripheral part of the surface of the first glass sheet 2 forming a frame.

A conductive coating 6 is deposited on a part of the printed layer 3 forming a coated print portion 7 and on a part of the surface of the first glass sheet 2 forming a coated glass portion 8.

First and second busbars 4, 5 are arranged in electrical contact with the conductive coating 6. First busbar 4 comprises a first busbar portion 4.1 arranged on a different axis therefrom. First busbar portion 4.1 is on an axis parallel to and offset from first busbar 4, known as a "drop-down" busbar.

A first printed layer portion 3.1 is adjacent the first busbar portion 4.1 forming a first adjustable coated print portion 7.1 between the first and second busbars 4, 5.

A first temperature is measured at a central point A of the coated glass portion 8. Central point A may be cold if a portion of coating 6 is removed to form a sensor region near an upper edge on a centre line XX of the glazing 1.

A second temperature is measured at an upper corner point B of the coated print portion 7. Upper corner point B may be a hotspot if a portion of coating 6 is removed to form the sensor region.

A third temperature is measured to one side of the sensor region at a hotspot point H of the coated print portion 7. Hotspot point H may be due to an additional sensor region (not shown), for example an ERTICO window.

Figure 2:
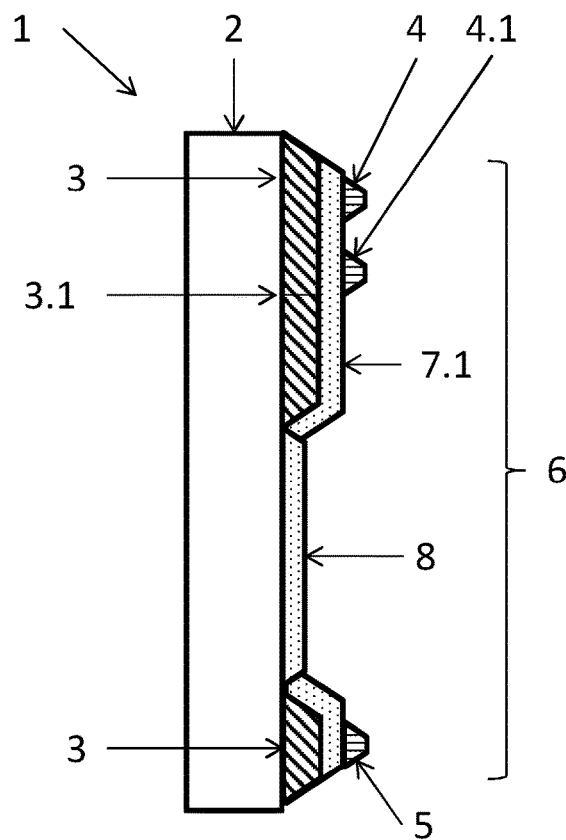
FIG. 2 is a cross-section of a glazing according to the invention, the busbars being on top of the conductive coating.

In FIG. 2 a cross-section of the glazing according to FIG. 1 is shown, in which the conductive coating 6 has been deposited on the printed layer 3 and then first and second busbars 4, 5 arranged on top.

Figure 3:
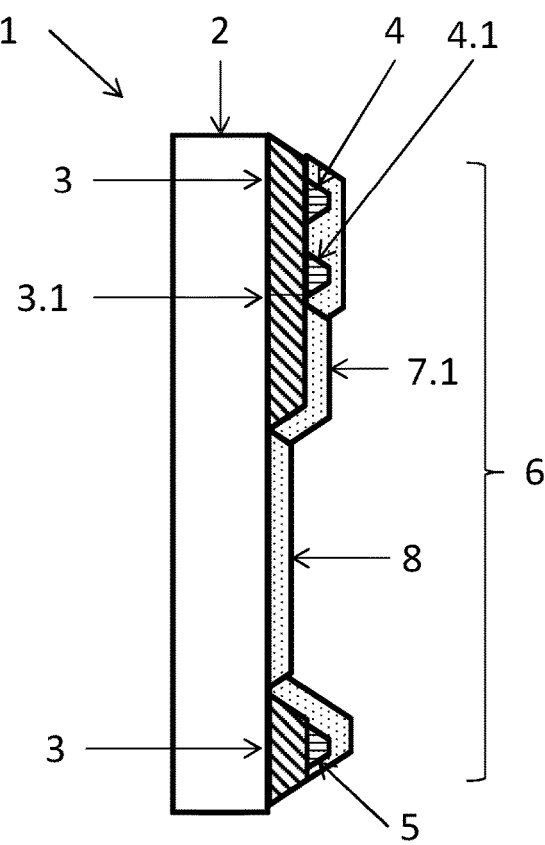
FIG. 3 is a cross-section of a glazing according to the invention, the conductive coating being on top of the busbars.

In FIG. 3 a cross-section of the glazing according to FIG. 1 is shown, in which first and second busbars 4, 5 have been arranged on the printed layer 3 and then the conductive coating 6 has been deposited on top.

Figure 4:
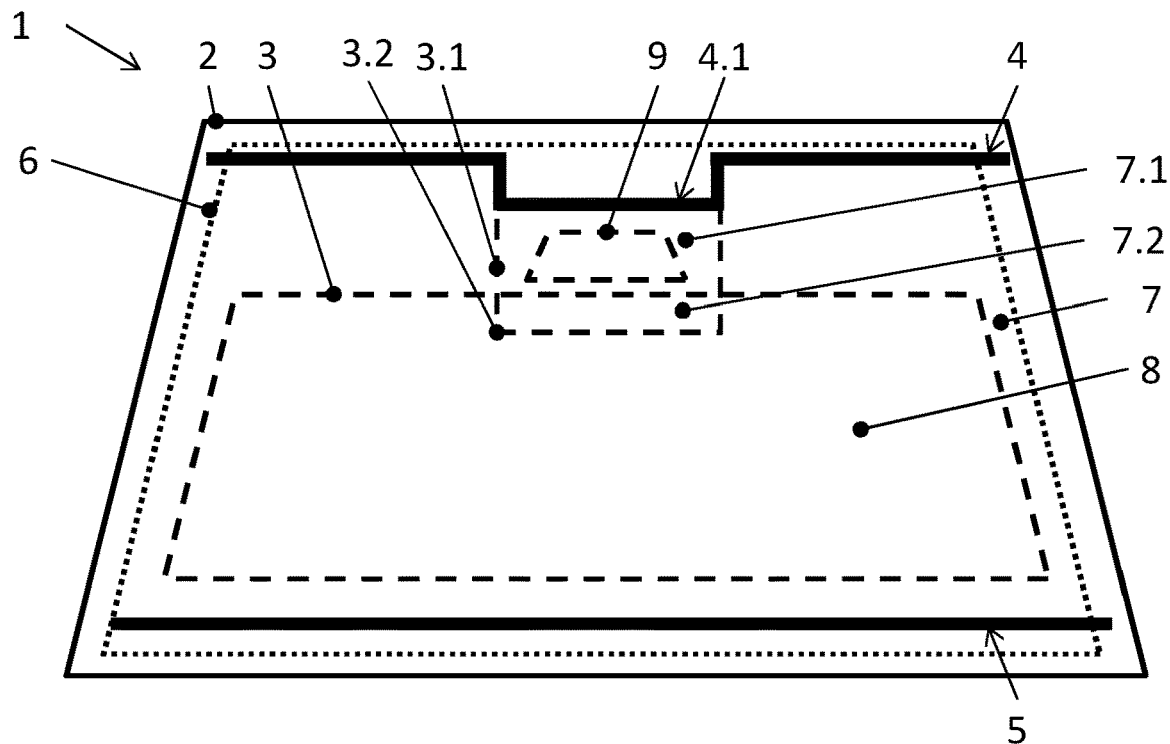
FIG. 4 is a plan view of a glazing according to the invention, having first and second coated print portions and a "drop-down" busbar above a data transmission window.

In FIG. 4 a glazing has a "drop-down" busbar 4.1 as in FIG. 1, positioned above a data transmission window 9. A first printed layer portion 3.1 adjacent the first busbar portion 4.1 forms a first adjustable coated print portion 7.1 between the first and second busbars 4, 5.

A second printed layer portion 3.2 adjacent the first printed layer portion 3.1 forms a second adjustable coated print portion 7.2 between the first and second busbars 4, 5.

First printed layer portion 3.1 extends from an edge of the glazing 1 in the direction of an opposing edge of the glazing 1. By contrast, second printed layer portion 3.2 protrudes further towards the opposing edge of the glazing 1.

A data transmission window 9 is positioned in first adjustable coated print portion 7.1, formed by first print layer portion 3.1. Second adjustable coated print portion 7.2 protrudes perpendicularly below to reduce current flow in the direction of the busbar portion 4.1 and to thereby reduce hotspot temperatures around the data transmission window 9.

Figure 5:
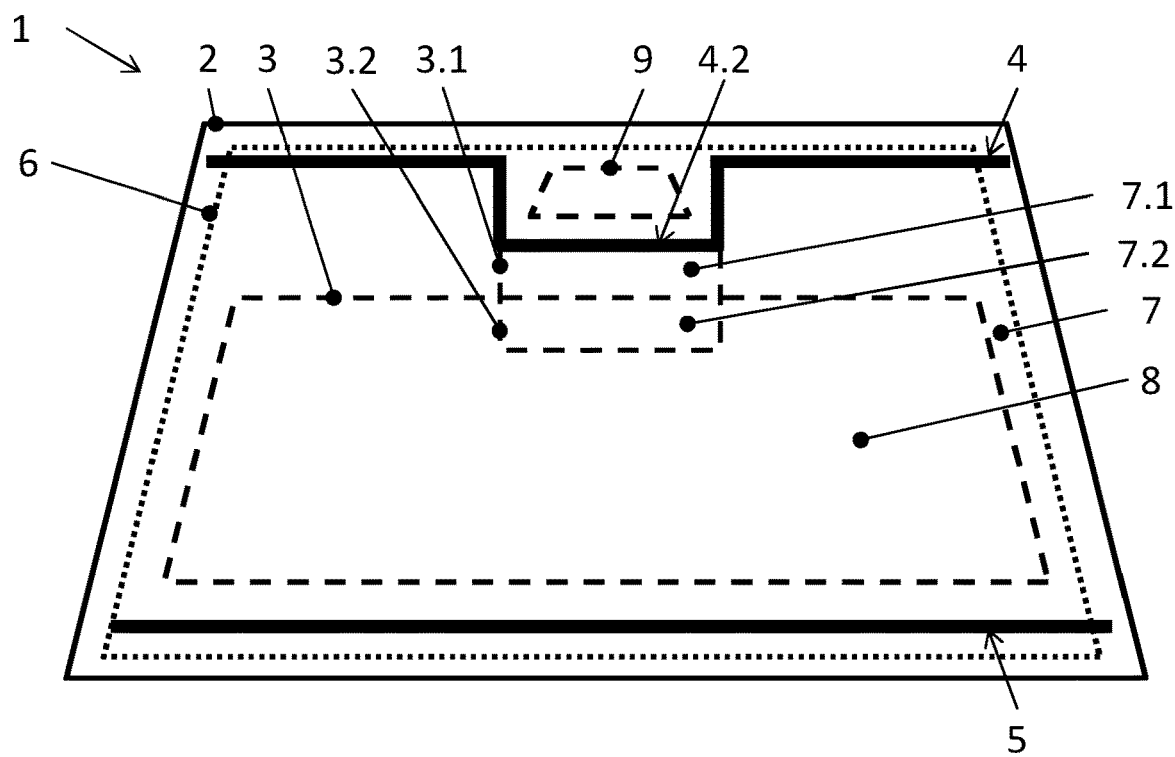
FIG. 5 is a plan view of a glazing according to the invention, having an "under camera" busbar, i.e. a data transmission window above a busbar.

In FIG. 5 data transmission window 9 is positioned adjacent an upper edge of the glazing 1 so busbar portion 4.2 forms an "under camera" busbar. Hotspots directly around the data transmission window 9 are avoided, but a shorter current path between busbar portion 4.2 and the second busbar 5 could increase heat in the centre of the glazing 1. First and second adjustable coated print portions 7.1, 7.2 are provided perpendicularly below busbar portion 4.2 to control heat in the centre of the glazing 1.

Figure 6:
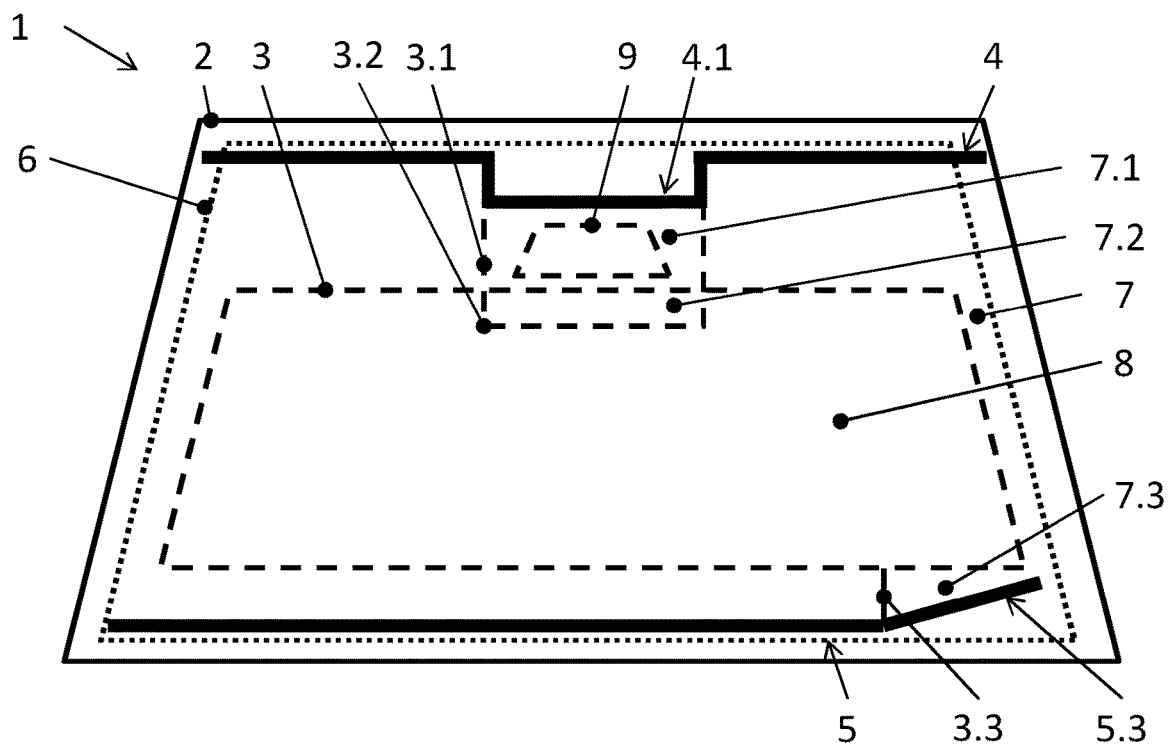
FIG. 6 is a plan view of a glazing according to the invention, having a "drop-down" busbar above a data transmission window and a lower busbar having a raised corner.

In FIG. 6, like FIG. 4, a "drop-down" busbar portion 4.1 is provided in first busbar 4. Second busbar 5 comprises a raised corner busbar portion 5.3. Adjacent coated print portion 3.3 is shaped as a triangle so that more current flow is possible through adjustable coated print portion 7.3 and a cold spot near an end of the lower busbar 5 is avoided.

Figure 7:
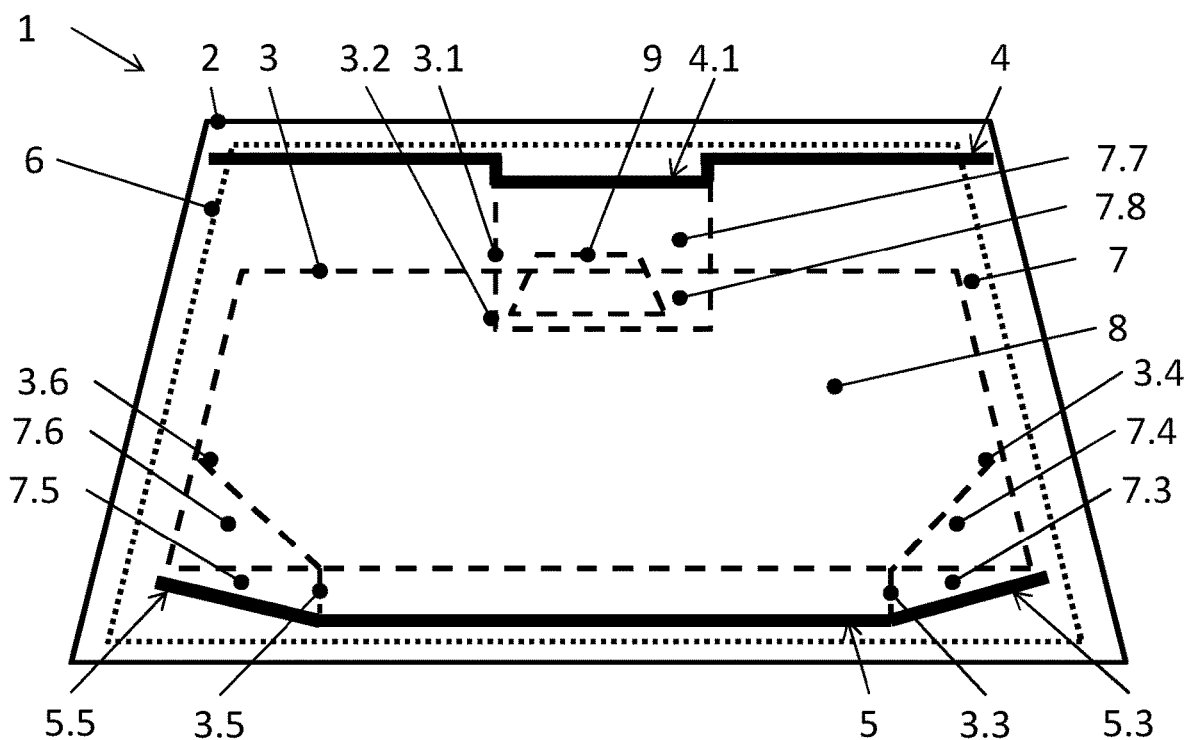
FIG. 7 is a plan view of a glazing according to the invention, having a "drop-down" busbar with a silver dot pattern and a lower busbar with two raised corners.

In FIG. 7, like FIG. 6, a raised corner busbar portion 5.3 forms adjustable coated print portion 7.3 to increase current flow. An additional printed layer portion 3.4 shaped as a triangle forms an additional adjustable coated print portion

7.4 to avoid a hotspot. Any shape may be used, for example stepped, curved or a section of an ellipse to suit styling requirements and to achieve a desired temperature.

In a second corner a raised corner busbar portion 5.5 has an adjacent coated print portion 3.5, forming an adjustable coated print portion 7.5 to increase current flow. An additional printed layer portion 3.6 shaped as a triangle forms an additional adjustable coated print portion 7.6 to avoid a hotspot.

Figure 8:
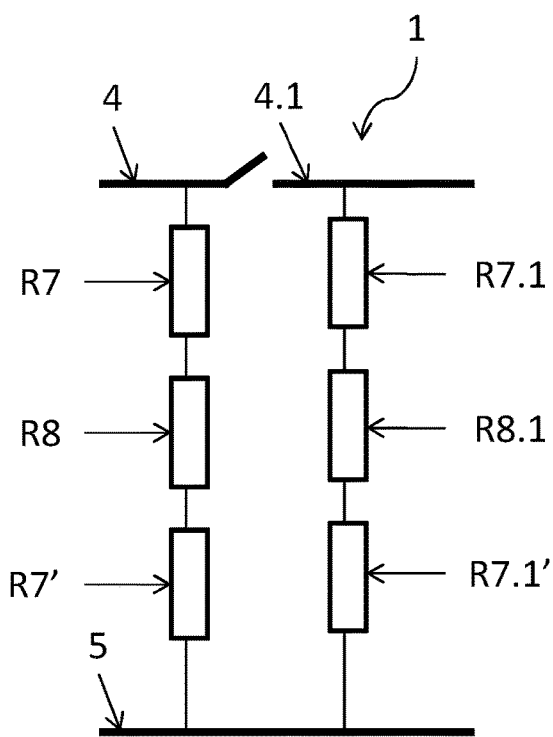
FIG. 8 is an equivalent circuit of a glazing according to the invention, FIG. 1.

FIG. 8 shows an equivalent circuit corresponding to FIG. 1. A first busbar portion 4.1 supplies current to adjustable coated print portion 7.1 forming a resistor R7.1. Resistor R7.1 is part of a series combination with resistor R8.1 formed by part of coated glass portion 8 and with resistor R7.1' formed by coated print portion 7 below R8.1, both in line with first busbar portion 4.1.

A remainder of the coated print portion 7 forms resistor R7, part of a series combination with resistor R8 formed by a remainder of the coated glass portion 8 and with resistor R7' formed by a remainder of coated print portion 7 below a remainder of R8, both not in line with first busbar portion 4.1.

Figure 9:
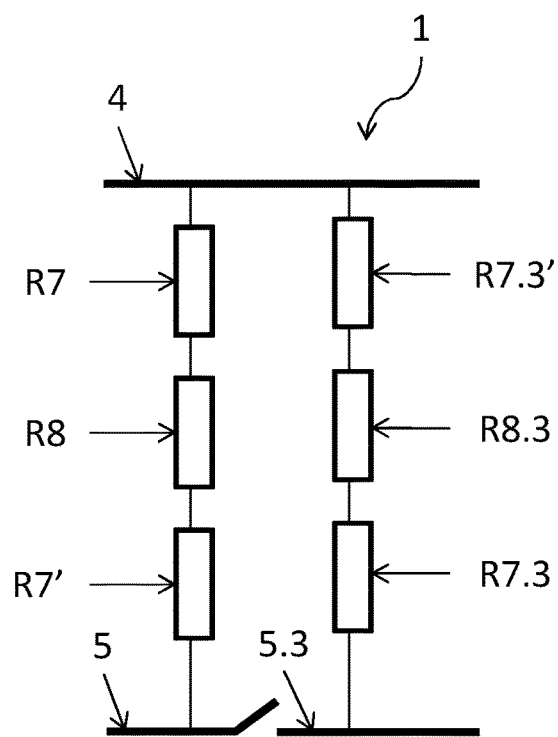
FIG. 9 is an equivalent circuit of a glazing according to the invention, having a lower busbar with a raised corner.

FIG. 9 shows an equivalent circuit corresponding to FIG. 6. A first raised busbar portion 5.3 supplies current to adjustable coated print portion 7.3 forming a resistor R7.3. Resistor R7.3 is part of a series combination with resistor R8.3 formed by part of coated glass portion 8 and with resistor R7.3' formed by coated print portion 7 above R8.3, both in line with raised busbar portion 5.3.

A remainder of the coated print portion 7 forms resistor R7, part of a series combination with resistor R8 formed by a remainder of the coated glass portion 8 and with resistor R7' formed by a remainder of coated print portion 7 below a remainder of R8, both not in line with raised busbar portion 5.3.

Figure 10:
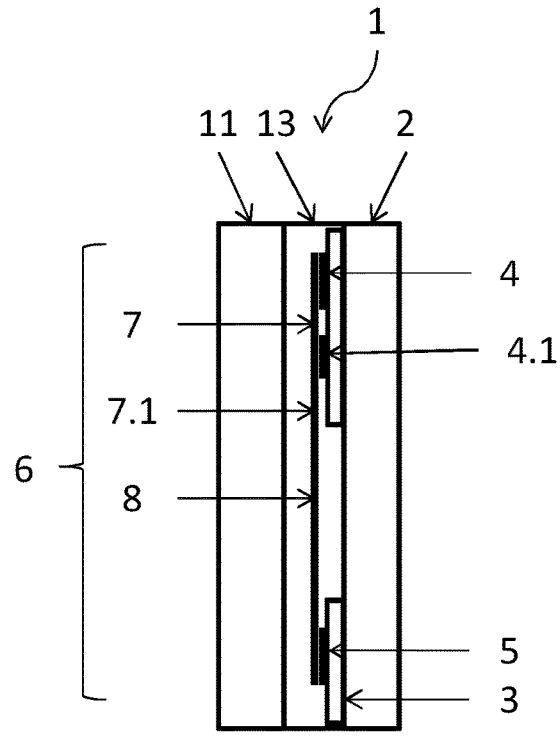
FIG. 10 is a cross-section of a glazing according to the invention, comprising a laminated glass.

In FIG. 10 a glazing 1 is a laminated glass comprising first glass sheet 2 and second glass sheet 11 bonded together by a ply of interlayer material 13. For clarity, conductive coating 6 is shown as a straight line representing a coating confirming to the printed layer 3 and first and second busbars 4, 5 on which it is deposited.

EXAMPLES

The following is a description of examples of the present invention. The present invention is not limited to the examples described below.

Table 1 shows temperature measurements related to one comparative example and six examples of the invention, generally as shown in FIG. 1 to FIG. 10.

In all seven cases coated print portion 7 has sheet resistance 8 ohms/square.

The comparative example lacks a busbar portion 4.1, 4.2, 5.3, 5.5; i.e. first and second busbars 4, 5 are straight lines.

Example 1 has a "drop-down" busbar portion 4.1. Offset from remainder of busbar 4 is 30 mm.

Example 2 is like Example 1, but offset is 60 mm.

Example 3 has an "under camera" busbar portion 4.2. The busbar portion 4.2 is supplied via a printed resistor providing a voltage drop 3.4 V.

Example 4 is like Example 3, but voltage drop is 4.7 V.

Example 5 has silver dots in adjustable coated print portions 7.7, 7.8. Silver dots are selected to provide sheet resistance 3.6 ohms/square.

Example 6 is like Example 5, but sheet resistance is 5.3 ohms/square.

Heating was simulated for 12 minutes at 42 V and temperature measurements were made at three locations in the glazing 1:

A: Centre line middle (centre in FIG. 1), a typical cold spot

B: Busbar top corner (upper busbar in FIG. 1) a typical hot spot

H: Hotspot at side of sensor region (right side in FIG. 1)

TABLE 1

| Example Number | Temperature (° C.)—Comparative Example Temperature difference (° C.)—Examples | | |
|---|---|---|---|
| | Centre line middle (A) | Busbar top corner (B) | Hotspot at side (H) |
| Comparative Example | 37.3 | 58.5 | 66.3 |
| Example 1: 30 mm drop-down | 1.0 | −0.9 | −1.7 |
| Example 2 60 mm drop-down | 2.6 | −1.9 | 2.5 |
| Example 3 Under camera 3.4 V | 9.2 | −3.9 | 14.7 |
| Example 4 Under camera 4.7 V | 6.8 | −3.1 | 6.7 |
| Example 5 Silver dots 3.6 ohms/sq. | 2.0 | −0.8 | −4.4 |
| Example 6 Silver dots 5.3 ohms/sq. | 1.1 | −0.7 | −3.8 |

"Drop-down" busbar portion 4.1, "under camera" busbar portion 4.2 and silver dots in adjustable coated print portions 7.7, 7.8 each have a technical effect to increase heating at a centre of a glazing 1 and reduce hotspots at a top corner.

Advantageously, adjustable coated print portions 7.1 to 7.8 increase temperature at the centre of the glazing 1 resulting in faster defogging and de-icing.

Raised corner busbar portions 5.3, 5.5 and associated adjustable coated print portions 7.3, 7.4, 7.5, 7.6 are also effective to eliminate cold spots at lower busbar ends.

According to the invention, the adjustable coated print portion is a coated print portion partly shaped by the first or second busbar portion arranged on a different axis from a major portion of the first or second busbar. The first or second busbar portion may be shaped as a line and parallel to and offset from the first or second busbar or may be at an angle thereto or may be stepped, curved or a section of an ellipse.

KEY TO THE DRAWINGS

Reference numerals in the drawings are as follows:
1: glazing
2: first glass sheet
3: printed layer
3.1, 3.2: first and second printed layer portions
3.3, 3.4: right raised corner printed layer portions
3.5, 3.6: left raised corner printed layer portions
4: first busbar
4.1, 4.2: first and second busbar portions
5: second busbar
5.3, 5.5: first and second raised corner busbar portions
6: conductive coating
7: coated print portion
7.1, 7.2: first and second adjustable coated print portions
7.3, 7.4: right raised corner adjustable coated print portions
7.5, 7.6: left raised corner adjustable coated print portions 7.7, 7.8: first and second silver dot adjustable coated print portions
8: coated glass portion
9: data transmission window
11: second glass sheet
13: ply of interlayer material
A: centre line middle temperature measurement point
B: busbar at top corner temperature measurement point
H: hotspot at side of sensor region
R7: resistor for coated print portion not in line with adjustable coated print portion 7.1, 7.3
R8: resistor for coated glass portion not in line with adjustable coated print portion 7.1, 7.3
R7': resistor for coated print portion under R8
R7.1: resistor for first adjustable coated print portion 7.1
R8.1: resistor for coated glass portion under first adjustable coated print portion 7.1
R7.1': resistor for coated print portion under R8.1
R7.3': resistor for raised corner adjustable coated print portion 7.3
R8.3: resistor for coated glass portion over raised corner adjustable coated print portion 7.3
R7.3: resistor for coated print portion under R8.1

The invention claimed is:

1. A glazing comprising:
   a first glass sheet having a surface;
   a printed layer directly on a part of the surface of the first glass sheet;
   a conductive coating directly on a part of the printed layer forming a coated print portion and directly on a part of the surface of the first glass sheet forming a coated glass portion;
   first and second busbars in electrical contact with the conductive coating and comprising a first or second busbar portion arranged on a different axis therefrom; and
   a first printed layer portion adjacent the first or second busbar portion forming an adjustable resistance coated print portion between the first and second busbars, wherein said adjustable resistance coated print portion is configured to reduce temperature variations in predetermined regions of the glazing.

2. A glazing according to claim 1, wherein the first and second busbars are arranged directly on the printed layer.

3. A glazing according to claim 1, comprising a data transmission window wherein the conductive coating is at least partly absent.

4. A glazing according to claim 3, wherein the data transmission window is arranged between the first or second busbar portion and an opposing busbar.

5. A glazing according to claim 3, wherein the data transmission window is arranged between the first or second busbar portion and an adjacent edge of the glazing.

6. A glazing according to claim 1, comprising a second printed layer portion adjacent the first printed layer portion forming a second adjustable coated print portion between the first and second busbars.

7. A glazing according to claim 1, wherein the first or second busbar portion is shaped as a line parallel to the first or second busbar or at an angle to the first or second busbar or shaped as a curve.

8. A glazing according to claim 1, wherein the first adjustable coated print portion or second adjustable coated print portion is shaped as a rectangle, square, triangle, polygon or section of an ellipse.

9. A glazing according to claim 1, wherein the first adjustable coated print portion or second adjustable coated print portion is arranged in the centre or in at least one corner of the glazing.

10. A glazing according to claim 1, comprising a pattern of printed silver dots in electrical contact with the coated print portion forming a first or second low sheet resistance coated print portion.

11. A glazing according to claim 1, wherein the first and second busbars are printed using screen-printing paste comprising frit and at least 80% silver.

12. A glazing according to claim 1, wherein the coated print portion has sheet resistance in a range 1 to 300 ohms/square and a Developed Interfacial Area Ratio Sdr in a range 1 to 30%.

13. A glazing according to claim 1, comprising a second glass sheet bonded to the first glass sheet by a ply of interlayer material to form a laminated glass.

14. A method of manufacturing a glazing, comprising:
   providing a first glass sheet having a surface;
   printing an insulating layer directly on a part of the surface of the first glass sheet to produce a printed layer;
   depositing a conductive coating directly on a part of the printed layer to form a coated print portion and directly on a part of the surface of the first glass sheet to form a coated glass portion;
   providing first and second busbars in electrical contact with the conductive coating and comprising a first or second busbar portion arranged on a different axis therefrom; and
   arranging a first printed layer portion adjacent the first or second busbar portion forming a first adjustable resistance coated print portion between the first and second busbars, wherein said first adjustable resistance coated print portion is configured to reduce temperature variations in predetermined regions of the glazing.

15. Use of glazing according to claim 1 as a window for a building or a window for a vehicle.

16. A glazing according to claim 1, wherein the coated print portion has sheet resistance in a range 3 to 8 ohms/square and a Developed Interfacial Area Ratio Sdr in a range 1 to 30%.

* * * * *